United States Patent
Vallone et al.

(10) Patent No.: US 8,327,983 B1
(45) Date of Patent: Dec. 11, 2012

(54) ENHANCED DAMPING USING MOTION AMPLIFICATION

(75) Inventors: Phillip Vallone, Honeoye Falls, NY (US); Alan Thomas Brewen, Rochester, NY (US); John Craig Fasick, Lima, NY (US); Douglas William Gates, Rochester, NY (US)

(73) Assignee: Exelis, Inc., McLean, VA (US)

( * ) Notice: Subject to any disclaimer, the term of this patent is extended or adjusted under 35 U.S.C. 154(b) by 545 days.

(21) Appl. No.: 12/558,880

(22) Filed: Sep. 14, 2009

(51) Int. Cl.
*F16F 15/03* (2006.01)

(52) U.S. Cl. ............... 188/267; 188/321.11; 188/161

(58) Field of Classification Search ............ 188/267, 188/267.2, 321.11, 161, 164
See application file for complete search history.

(56) References Cited

U.S. PATENT DOCUMENTS

| | | | |
|---|---|---|---|
| 1,706,171 A | | 3/1929 | Kinnard |
| 2,888,634 A | | 5/1959 | Ault |
| 3,573,518 A | | 4/1971 | Liles |
| 3,921,746 A | * | 11/1975 | Lewus ............... 180/165 |
| 4,030,031 A | | 6/1977 | Stucker |
| 4,260,901 A | * | 4/1981 | Woodbridge ............ 290/42 |
| 4,517,505 A | | 5/1985 | Cunningham |
| 4,815,574 A | | 3/1989 | Taylor et al. |
| 5,054,587 A | | 10/1991 | Matsui et al. |
| 5,249,783 A | | 10/1993 | Davis |
| 5,392,881 A | | 2/1995 | Cho et al. |
| 5,445,249 A | | 8/1995 | Aida et al. |
| 5,736,798 A | | 4/1998 | O'Brien et al. |
| 5,749,243 A | | 5/1998 | Lester |
| 5,856,638 A | | 1/1999 | Burkhard et al. |
| 5,896,961 A | | 4/1999 | Aida et al. |
| 5,934,028 A | | 8/1999 | Taylor |
| 5,947,237 A | | 9/1999 | McMichael et al. |
| 6,008,881 A | | 12/1999 | Warmerdam et al. |
| 6,019,201 A | | 2/2000 | Gordaninejad et al. |
| 6,064,132 A | | 5/2000 | Nose |
| 6,327,024 B1 | | 12/2001 | Hayashi et al. |
| 6,333,848 B1 | | 12/2001 | Aida et al. |
| 6,501,203 B2 | | 12/2002 | Tryggvason |
| 6,505,718 B2 | | 1/2003 | Fujita et al. |
| 6,982,502 B1 | * | 1/2006 | Sendaula et al. ............ 310/26 |
| 7,012,340 B2 | * | 3/2006 | Yi ........................ 290/42 |
| 7,196,601 B1 | | 3/2007 | Gottschalk |
| 7,323,790 B2 | * | 1/2008 | Taylor et al. ............ 290/42 |
| 2003/0146748 A1 | | 8/2003 | Duncan et al. |
| 2007/1318306 | | 6/2007 | Brennan et al. |
| 2008/0209919 A1 | | 9/2008 | Ackermann et al. |

OTHER PUBLICATIONS

Stefano Berton, et al., Amplification System for Supplemental Damping Devices in Seismic Applications, Journal of Structural Engineering, Jun. 2005, pp. 979-983.
European Patent Search for EP 10189805.4-1264, EPO, Apr. 5, 2012.

* cited by examiner

*Primary Examiner* — Bradley King
*Assistant Examiner* — Nicholas J Lane
(74) *Attorney, Agent, or Firm* — RatnerPrestia

(57) ABSTRACT

A damping apparatus is provided having a payload member, an extension member, and a damping member. The extension member is coupled to the payload member such that when the payload member moves a first distance, the extension member moves a second distance greater than the first distance. The damping member applies a damping force to the extension member when the extension member moves. The application of the damping force to the extension member causes a damping force on the payload member that is greater than the damping force on the extension member. The damping apparatus may utilize permanent magnets and conductive extension members to generate the damping force.

7 Claims, 8 Drawing Sheets

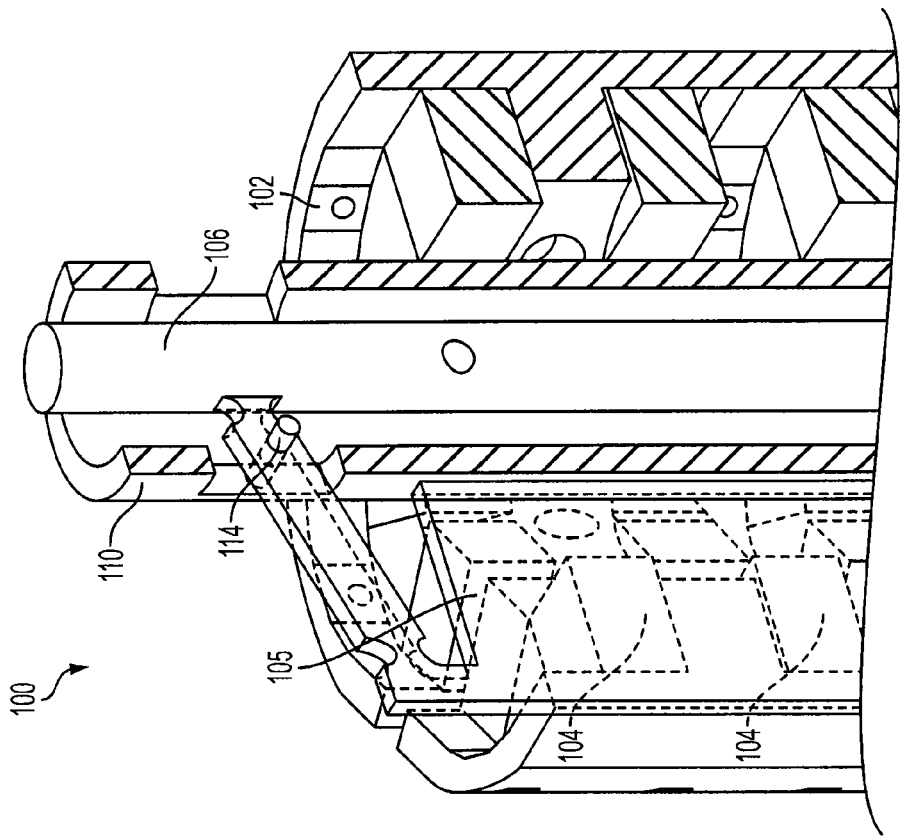
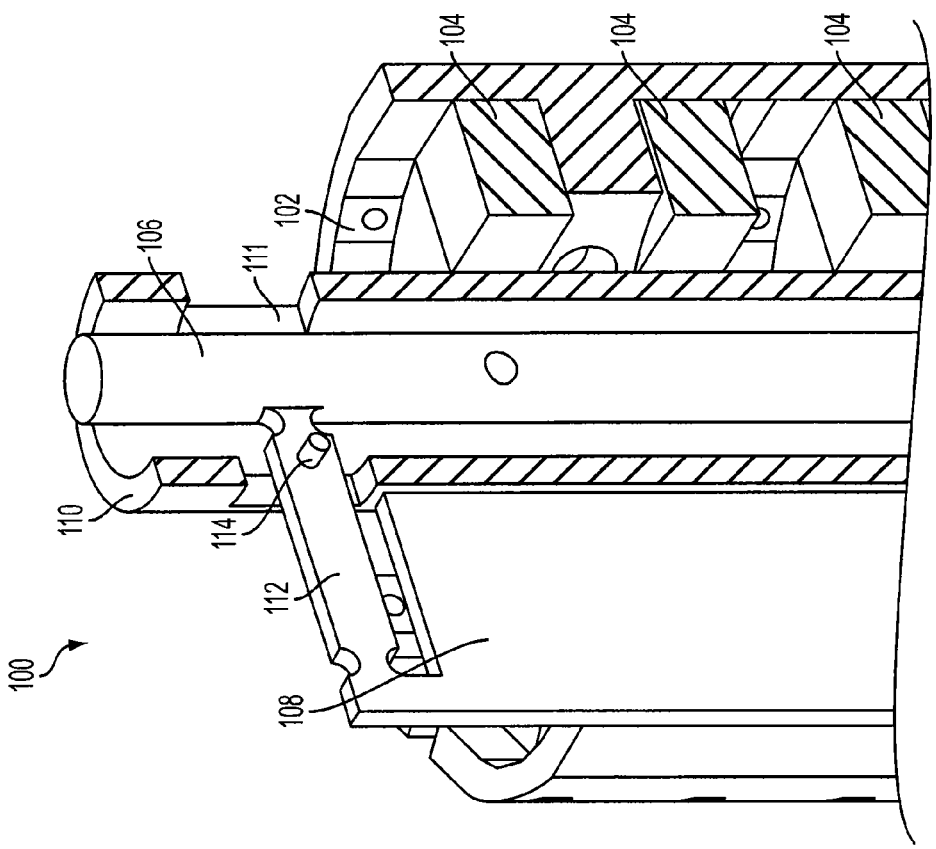

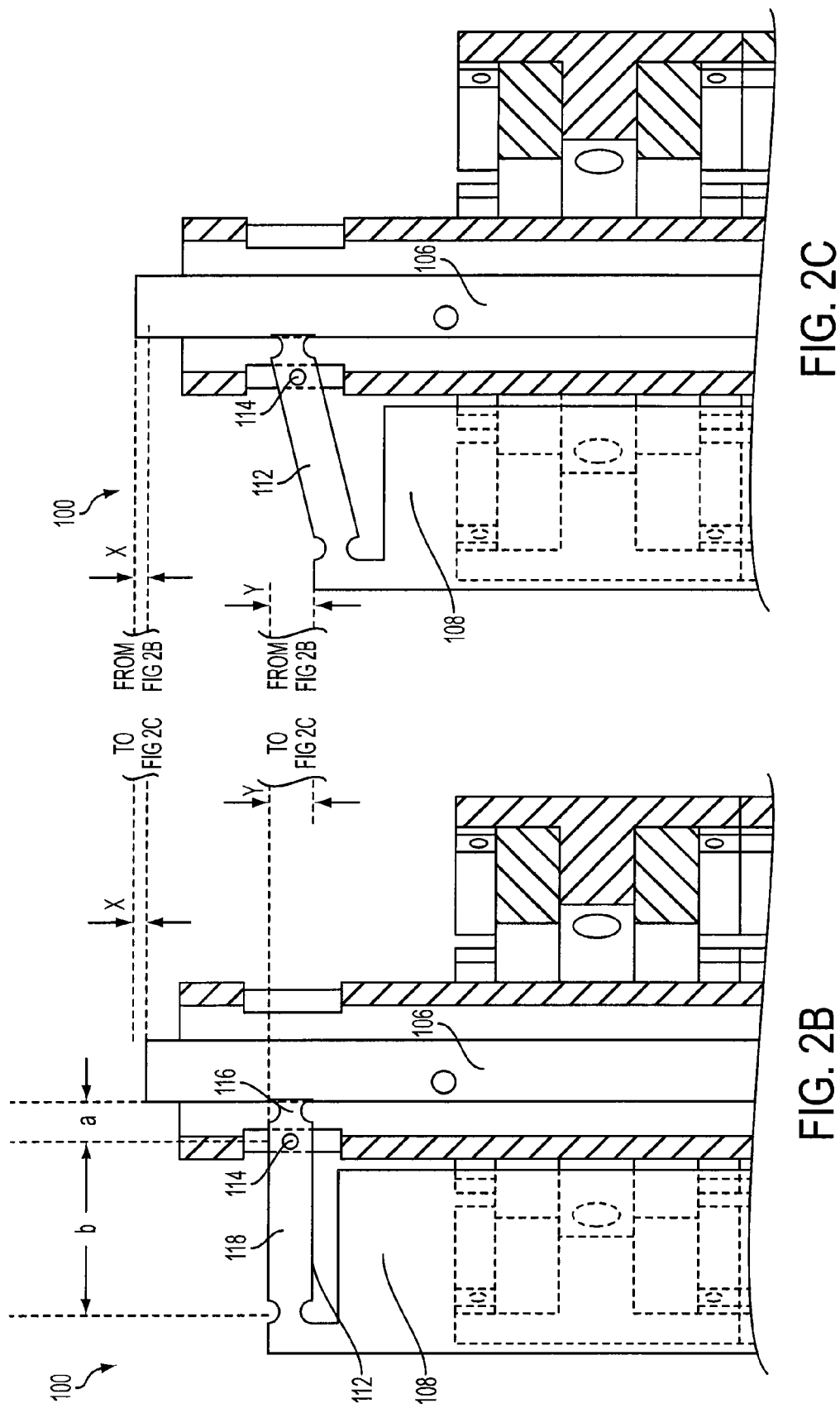

ENHANCED DAMPING USING MOTION AMPLIFICATION

BACKGROUND OF THE INVENTION

Linear dampers are devices designed to provide absorption of shock and smooth deceleration in linear motion applications. Dampers provide shock absorption through the application of a damping force in the direction of the linear motion. Dampers may generate the damping force from a variety of means. Dampers may be mechanical (e.g., elastomeric or wire rope isolators), fluid (e.g. gas, air, hydraulic), or even magnetic (e.g. through magnetically induced eddy currents).

Fluid dampers (i.e. hydraulic dampers) depend on the viscosity of a fluid to absorb or dissipate kinetic energy generated by relative motion. Hydraulic dampers allow the fluid to absorb the shock of motion by controlled fluid flow between chambers of a cylinder during piston actuation. Frictionless hydraulic dampers (i.e. without the use of cylinders/pistons) are desired for certain applications to attenuate forces between relatively movable objects where the internal frictional resistance of the dampers is objectionable due to wear and static friction. An exemplary frictionless hydraulic damper is disclosed in U.S. Pat. No. 4,815,574 to Taylor et al, which is included herein by reference.

Magnetic dampers provide a linear damping element in a compact form. Magnetic dampers do not suffer from certain problems associated with hydraulic dampers including friction or leaking of fluids. Additionally, magnetic dampers can operate more consistently over wider temperature ranges than fluidic dampers. However, when not used at cryogenic temperatures magnetic dampers can be relatively heavy.

SUMMARY OF THE INVENTION

Aspects of the present invention are embodied in damping apparatus. In one aspect of the present invention, a damping apparatus includes a payload member, an extension member, and a damping member. The extension member is coupled to the payload member such that a movement of a first distance by the payload member results in a movement of a second distance by the extension member which is greater than the first distance. The damping member applies a first damping force to the extension member in response to the movement of the extension member, wherein application of the first damping force to the extension member provides a second damping force on the payload member which is greater than the first damping force.

In another aspect of the present invention, a damping apparatus includes a rod, at least one flexible lever arm, at least one vane, and a plurality of magnets. The at least one flexible lever arm is coupled to the rod and configured to pivot about at least one pivot point. Each one of the at least one vane is coupled to a respective one of the at least one lever arm, such that a movement of a first distance by the rod causes the lever arm to move the at least one vane a second distance, where the second distance is greater than the first distance. The plurality of magnets is affixed to the housing and configured to apply a first damping force to the at least one vane responsive to the movement of the at least one vane, wherein application of the first damping force to the at least one vane causes the lever arm to provide a second damping force on the rod which is greater than the first damping force.

In yet another aspect of the present invention, a damping apparatus includes a rod, at least one scissor arm, at least one vane, and a plurality of magnets. The at least one scissor arm is coupled to the rod. Each one of the at least one vane is coupled to a respective one of the at least one scissor arm, such that a movement of a first distance by the rod causes the at least one scissor arm to move the at least one vane a second distance, the second distance being greater than the first distance. The plurality of magnets is configured to apply a first damping force to the at least one vane in response to the movement of the at least one vane, wherein application of the first damping force to the at least one vane causes the scissor arm to provide a second damping force on the rod which is greater than the first damping force.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures:

FIGS. 1A and 1B are cut-away perspective views of an exemplary damping apparatus according to an embodiment of the present invention;

FIGS. 2A-2C are cut-away side views of the exemplary damping apparatus of FIG. 1;

DETAILED DESCRIPTION OF THE INVENTION

Figure 2A:
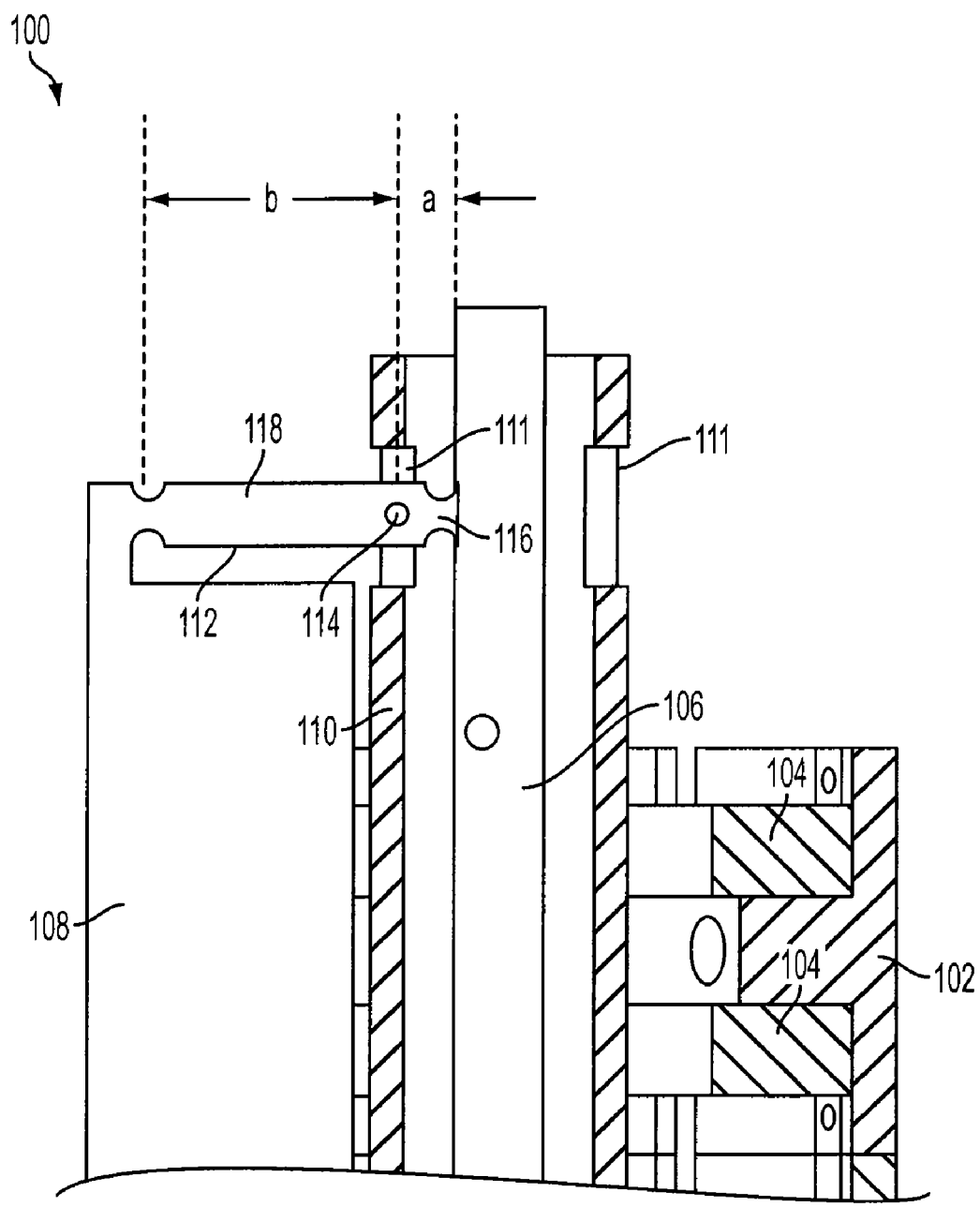

The present invention uses motion amplification in order to increase a damping force applied by a linear damper. Although the invention will be described primarily with respect to embodiments employing magnetic damping, it will be understood by one of ordinary skill in the art that the principles of the motion amplification are applicable to other damping devices as well, such as fluid dampers.

The present invention may be embodied in a magnetic damper device achieving weight and volume efficiencies adequate to meet the requirements of most applications.

For the purpose of describing the function of the present invention, it may be assumed that an instrument or other material is subject to vibration caused by a vibrational force. The material subject to vibration may include a first portion (i.e. a base) and a second portion (i.e. a payload) which vibrates relative to the first portion. An exemplary damping apparatus of the present invention may be provided at the base to provide a damping force to the payload and, therefore, decrease the relative vibration. It will be understood, however, that the exemplary damping apparatus may be coupled with any body in which relative vibration is undesirable.

The damping force provided by the exemplary damping apparatus may be applied when weight and volume of the element are limited to predetermined amounts. The damping force provided by the exemplary damping apparatus, however, may also be applied to other applications, such as for example, ground test vibrations, vehicle vibration (i.e. cars, trains, planes, etc.), laboratory and fabrication equipment vibration (i.e. optical tables, micro-lithography and precision machine tools) and ground telescope isolation.

In general, exemplary damping apparatuses of the present invention include a payload member, an extension member extending from the payload member, and a damper member for damping the payload and extension members. Exemplary damping apparatus of the present invention decrease displacement by providing a damping force (e.g. through magnetically induced eddy currents) in opposition of the vibrational force on the payload. The vibrational force from the payload is applied to a payload member (e.g., a rod) of the damping apparatus. The payload member of the damping apparatus is coupled to an extension member (e.g., a vane) by a displacement amplifying lever arm, or more generally a displacement amplifying mechanism (e.g. a so-called "scissor jack" or a hydraulic amplification mechanism). In one embodiment, a lever arm is configured to rotate about a pivot point. When the rod moves in a first direction (due to the vibration of the payload), the lever causes the vane to move between magnets in a direction substantially opposite to the rod. The pivot point may be chosen to increase the distance moved by the vane with respect to the distance moved by the rod. A damping force is provided to the vane by a damping member (i.e. the magnets) as the vane moves between the magnets. The damping force on the vane, therefore, is applied to the rod via the lever arm, and the displacement of the payload is thereby decreased.

In this first embodiment, the damping force on the vane is amplified by the lever arm and transferred to the rod based on the position of the point of rotation along the lever arm. The damping force on the vane may be amplified on the payload based on (1) the distance between the pivot point of the lever arm and the vane and (2) the distance between the pivot point of the lever arm and the rod.

The invention will now be described with regard to the accompanying drawings. FIGS. 1A and 1B are cut-away perspective views of an exemplary damping apparatus 100 according to an aspect of the present invention. As described above, damping apparatus 100 may be used to damp the vibration of a payload relative to a base. Damping apparatus 100 includes housing 102, magnets 104, rod 106, vanes 108, inner cylinder 110, lever arm 112, and pivot point 114. Additional details of damping apparatus 100 are now described below.

The housing 102 houses the damping apparatus. In an exemplary embodiment, housing 102 is attached to a base (not shown). Housing 102 may provide support for the elements of damping apparatus 100 that provide the payload with a damping force. An exemplary housing 102 may be formed from suitable non-magnetic materials or a combination of magnetic and non-magnetic materials. Although housing 102 is illustrated having a generally cylindrical outer shape, it is contemplated that housing 102 may be any shape to accommodate and support the elements of apparatus 100.

The magnets 104 are attached to the inside of housing 102. In an exemplary embodiment, magnets 104 are circumferentially arranged around the inner surface of housing 102. The magnets may extend axially throughout housing 102. Magnets 104 are spaced apart to define a number of circumferential gaps 105. Each gap is configured to receive a vane 108. Magnets 104 may be any suitable type of permanent magnets and may include rare earth magnets. Magnets 104 may further be include electromagnets. As will be discussed herein, magnets 104 and vanes 108 are interchangeable in position with respect to apparatus 100.

The rod 106 extends axially through housing 102. In an exemplary embodiment, rod 106 is coupled to the payload (not shown). Rod 106, thereby, receives the vibrational forces acting on the payload. Accordingly, rod 106 is movable within the housing in the axial direction. An exemplary rod 106 may be formed from suitable non-magnetic materials or a combination of magnetic and non-magnetic materials. Although rod 106 is illustrated as an elongated axial cylinder, it is contemplated that any payload member affixed to the payload and movable in response to a vibration of the payload may be used.

The vanes 108 extend axially through housing 102. In an exemplary embodiment, vanes 108 are coupled to rod 106 through lever arm 112. Vanes 108 may extend radially outward from rod 106 into gaps 105 between magnets 104. Vanes 108 may be coupled to rod 106 such that a movement of rod 106 axially results in a movement of vanes 108. Vanes 108 may further be coupled to move in the opposite direction of rod 106. In a further exemplary embodiment, vanes 108 may be coupled to move axially such that vanes 108 remain in gaps 105 between magnets 104. Although one vane 108 is illustrated in FIGS. 1A and 1B, it is contemplated that apparatus 100 may include multiple vanes 108 extending from rod 106 in different radial directions. Vanes 108 may be formed from any suitable conductive material. Exemplary vanes 108 may be formed of a conductive material, such as copper, aluminum, or beryllium. Exemplary vanes may also be formed of a combination of conductive and non-conductive materials. Although vanes 108 are illustrated as flat sheets, it is contemplated that any extension member extending from rod 106 between magnets 104 may be used.

The inner cylinder 110 extends axially through housing 102. The inner cylinder 110 is connected to the base or to housing 102. In an exemplary embodiment, inner cylinder 110 is disposed around rod 106. The inner cylinder may include one or more openings 111 to enable vanes 108 to be coupled to rod 106. Openings 111 may also include pivot points 114 for optimizing movement of vanes 108 relative to rod 106, as will be described below. An exemplary inner cylinder 110 may be formed from materials similar to those used for housing 102. Although inner cylinder 110 is illustrated as a hollow, tubular member, it is contemplated that any inner housing may be provided that allows for coupling rod 106 to vanes 108.

The lever arm 112 connects rod 106 with vanes 108. In an exemplary embodiment, lever arm 112 is fixed at one end to rod 106 and at an opposite end to vane 108. There may be one or more lever arms 112 attached to each vane 108. Lever arm 112 may comprise a flexure arm or a lever arm having flexure or rotary bearings. For example, the portion of lever arm 112 that attaches to vanes 108 may be flexible to allow a firm connection between lever arm 112 and vane 108 through varying angles of lever arm 112. As illustrated, the connection between lever arm 112 and vanes 108 or rod 106 may include cutout portions to allow lateral flexing of lever arm 112. Lever arm 112 may also be formed integrally with vanes 108. Lever arm 112 is attached to inner cylinder 110 at pivot point 114. As will be described, the lever arm may be attached to pivot point 114 such that movement of rod 106 in one direction causes movement of a corresponding vane 108 in substantially an opposite direction. However, it will be understood that rod 106 and vane 108 could be coupled to lever arm 112 such that they move in substantially the same direction. One example of this configuration could arise if both rod 106 and vane 108 are located on the same side of lever arm 112, with vanes 108 disposed farther from pivot point 114 than rod 106. It will further be understood that the shape of lever arm 112 is illustrative and not limiting. Lever arm 112 may take any shape such that the direction of amplified motion occurs at any angle relative to the input motion provided to rod 106.

The number of vanes and magnets shown in FIGS. 1A and 1B, as well as their size, shape and position are illustrative and not limiting. It is contemplated that different numbers of magnets and/or vanes may be used. Further, the size, shape and position of housing 102, inner cylinder 110 and rod 106 are illustrative and not limiting.

The coupling of vanes 108 to rod 106 will now be described with respect to FIGS. 2A-2C in accordance with an aspect of the present invention. As set forth above, lever arm 112 connects rod 106 with vane 108. Accordingly, damping apparatus 100 may include at least one lever arm 112 for each vane 108. In an exemplary embodiment, lever arm 112 is fixed at pivot point 114. Accordingly, for example, when rod 106 moves in a downward direction, lever arm 112 pivots about pivot point 114, thereby causing vane 108 to move in an upward direction.

The lever arm includes two portions: a first portion 116 extending from pivot point 114 to rod 106; and a second portion 118 extending from pivot point 114 to vane 108. As shown in FIG. 2A, first portion 116 has a length of "a," while second portion 118 has a length of "b." The lengths, "a" and "b", shown in FIG. 2A, are illustrative and not limiting. It is contemplated that the lengths of first and second portions 116 and 118 may be the same for each lever arm 112.

The movement of vanes 108 with respect to rod 106 is illustrated in FIGS. 2B and 2C. FIG. 2B illustrates damping apparatus 100 without any displacement of rod 106, and FIG. 2C illustrates damping apparatus 100 after an exemplary displacement of rod 106, caused by vibration of its associated payload (not shown). In an exemplary embodiment, the distance of movement of vane 108 relative to rod 106 may depend on the placement of pivot point 114 along lever arm 112 and the relative lengths of first and second portions 116 and 118. Rod 106 is depicted as having moved a distance "X" in the axial direction, in response to a vibration of the payload. As rod 106 moves upward, rod 106 imparts an upward force to first portion 116 of lever arm 112. The upward force on first portion 116 causes lever arm 112 to rotate about pivot point 114, thereby imparting a downward force on second portion 118. Section portion 118 may then impart a downward force on vane 108, which moves a distance "Y" in the opposite axial direction.

In an exemplary embodiment, the displacement "Y" is dependent on the distances "a" and "b" of first and second portions 116 and 118, respectively, of lever arm 112 and displacement "X" of rod 106. For small movements of rod 106, this relationship may be expressed as follows:

$$Y = \left(\frac{b}{a}\right)X$$

Accordingly, damping apparatus 100 may be configured such that the ratio of a displacement "Y" of vanes 108 in response to a displacement "X" of rod 106 is approximately equivalent to the ratio of the lengths of second portion 118 to first portion 116 (i.e. "b/a"). For example, the longer length "b" with respect to length "a," the greater the displacement "Y" of vanes 108 is with respect to the displacement "X" of rod 106. It will be understood that this ratio remains the same with respect to the respective velocities of rod 106 and vanes 108, such that the longer length "b" with respect to length "a," the greater the velocity $\dot{Y}$ of vanes 108 is with respect to velocity $\dot{X}$ of rod 106.

Figure 3:
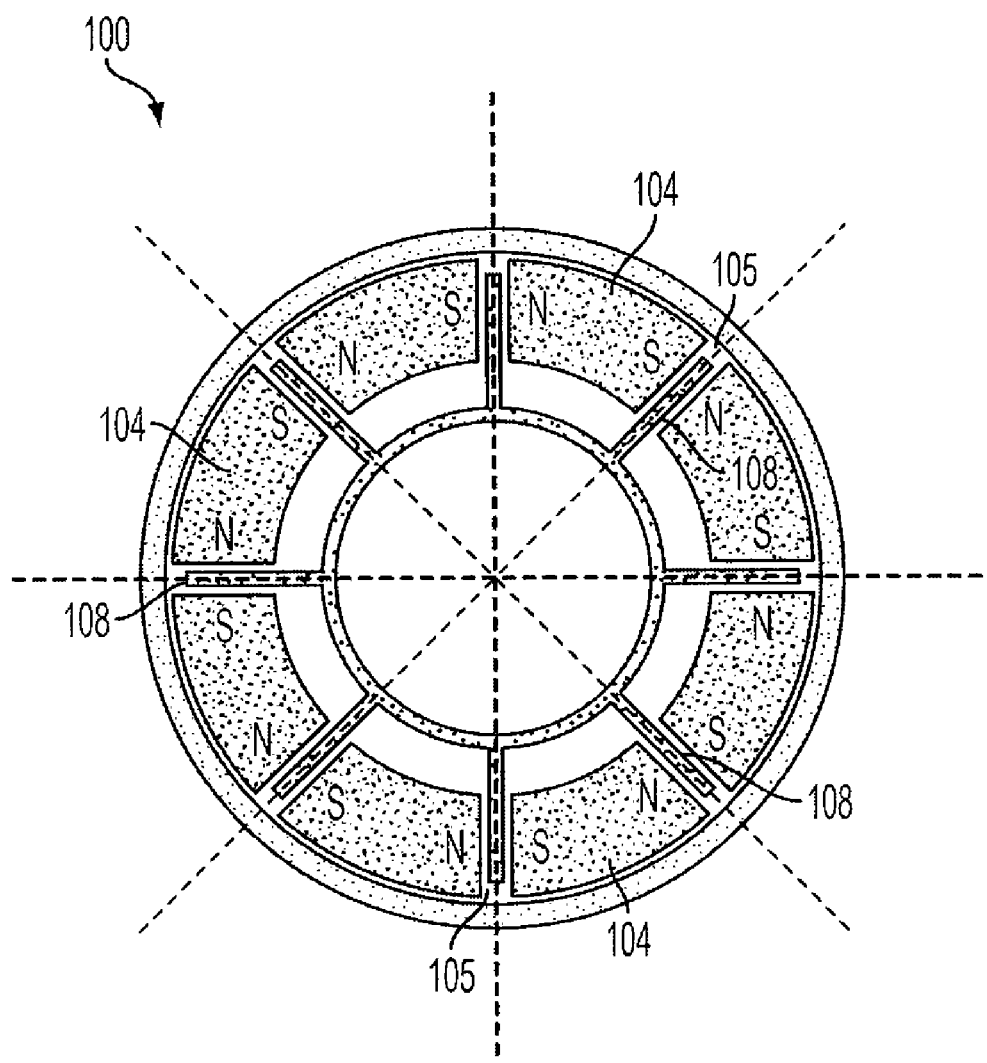
FIG. 3 is a schematic top cut-away view of the exemplary damping apparatus of FIG. 1.

The interaction between magnets 104 and vanes 108 will now be described with respect to FIG. 3 in accordance with an aspect of the present invention. FIG. 3 is a top schematic view of damping apparatus 100. As illustrated, damping apparatus 100 includes circumferentially arranged magnets 104. Uniform gaps 105 are provided between magnets 104. Vanes 108, or other suitable extension members, are shown extending into gaps 105. Vanes 108 may include flat sheets formed from conductive materials. Vanes 108 are coupled to rod 106 (not shown). The number of vanes and magnets shown in FIG. 3, as well as their size, shape and position are illustrative and not limiting.

Each magnet 104 includes two poles having opposite polarity (indicated as N and S in FIG. 3). Magnets 104 are oriented such that the poles of adjacent magnets have opposite polarity. This orientation creates a magnetic field extending from one magnetic pole to an adjacent opposite magnetic pole, thereby forming a magnetic field through gaps 105 and vanes 108. Movement of vanes 108 within this magnetic field induces an eddy current in vanes 108. This eddy current generates a magnetic flux which opposes the change in magnetic flux through vanes 108.

The eddy current in each vane 108 generates a magnetic field. This magnetic field interacts with the magnetic field of magnets 104, thereby generating a damping force $F_{vane}$ on each vane 108. The damping force applied to each vane may be expressed by the following equation:

$$F_{vane} = c_v \dot{Y}$$

where the coefficient $c_v$ is a damping constant. Damping constant $c_v$ is dependent in part on the resistivity of vanes 108 and the magnetic field of two magnets 104. As shown, the damping force is also dependent on the velocity $\dot{Y}$ of vanes 108. The damping force generated by the eddy currents within each vane has a direction opposite the velocity of the vane.

In an exemplary embodiment, the damping force applied to vane 108 is transferred to rod 106 via lever arm 112. As with the displacement described above, the damping force applied to rod 106 by each vanes 108 depends on the placement of pivot point 114 along lever arm 112 and the relative lengths of first and second portions 116 and 118. As described above, the movement of the vanes 108 generates a damping force $F_{vane}$ on each vane. As this damping force acts on each vane 108, each vane 108 imparts a torque to second portion 118 of lever arm 112. The torque on second portion 118 is transferred to first portion 116, and thereby imparts a damping force $F_{rod}$ to rod 106.

The damping force $F_{rod}$ is dependent on the distances "a" and "b" of first and second portions 116 and 118 of lever arm 112. The damping force on rod 106 may be expressed as follows:

$$F_{rod} = \left(\frac{b}{a}\right)F_{vane}$$

Accordingly, damping apparatus 100 may be configured such that the ratio of a damping force $F_{rod}$ on rod 106 in response to a damping force $F_{vane}$ on vanes 108 is approximately equivalent to the ratio of the lengths of second portion 118 to first portion 116 (i.e. "b/a"). For example, the longer length 'b" with respect to length "a," the greater the damping force on rod 106 with respect to the damping force on vanes 108.

The damping force $F_{rod}$ may be further defined using the above-described relationships between the damping force $F_{vane}$ on vanes 108 and the velocity $\dot{Y}$ of vanes 108. The damping force on the rod may ultimately be expressed as follows:

$$F_{rod} = \left(\frac{b}{a}\right) F_{vane} = \left(\frac{b}{a}\right) c_v \dot{Y}$$

$$F_{rod} = \left(\frac{b}{a}\right) c_v \left(\left(\frac{b}{a}\right) \dot{X}\right)$$

$$F_{rod} = c_v \left(\frac{b}{a}\right)^2 \dot{X}$$

where the coefficient $c_v$ is the damping constant. As shown, the damping force on rod 106 is dependent on the velocity $\dot{X}$ of rod 106. The damping force may be amplified by the square of the ratio of the lengths of second portion 118 to first portion 116 of lever arm 112 (i.e. $(b/a)^2$).

Operation of the exemplary damping apparatus 100 will now be described with reference to the above equations. In operation, rod 106 is displaced a distance "X" due to a vibration of its associated payload. The displacement "X" of rod 106 causes vanes 108 to be displaced a distance "Y" through the action of lever arm 112 about pivot point 114. Where the length of portion 118 of lever arm 112 is longer than the length of portion 116 of lever arm 112, the distance "Y" will be amplified by a factor of ("b/a"), and distance "Y" will be larger than the distance "X". The displacement "Y" of vanes 108 causes vanes 108 to travel at a certain velocity $\dot{Y}$. This velocity of the vanes 108 through the magnetic field, generated by magnets 104, generates eddy current in vanes 108. The eddy currents in vanes 108 then generates a damping force $F_{vane}$ in opposition to and dependent on the velocity $\dot{Y}$ of vanes 108. The application of damping force $F_{vane}$ to vanes 108 causes a corresponding damping force $F_{rod}$ on rod 106 through the action of lever arm 112 about pivot point 114. Again, where the length of portion 118 of lever arm 112 is longer than the length of portion 116 of lever arm 112, the damping force $F_{rod}$ will be amplified by the square of the ratio $(b/a)^2$ of the lengths of the first and second portions 116 and 118.

Figure 4:
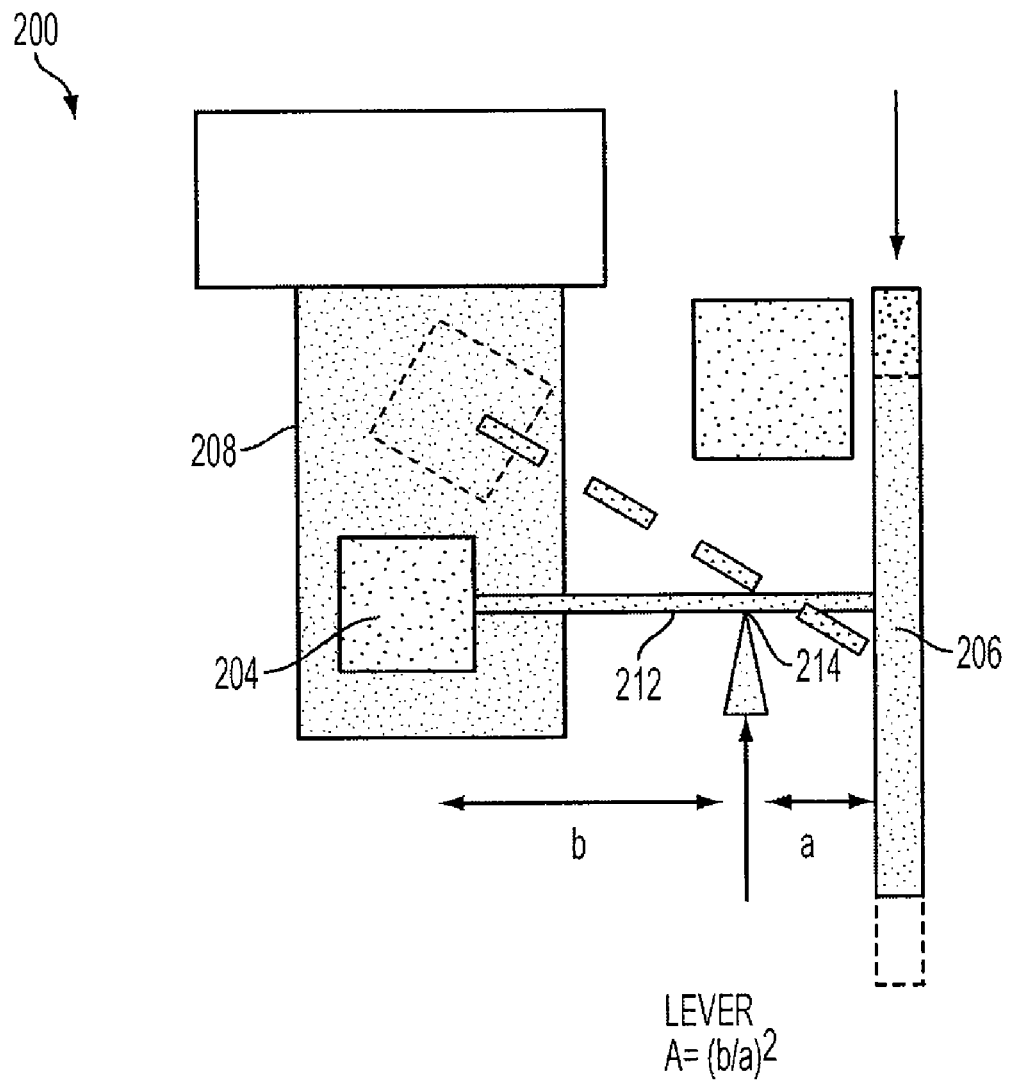
FIG. 4 is a diagram of an exemplary damping apparatus in accordance with another aspect of the present invention.

FIG. 4 is a diagram of an exemplary damping apparatus 200 in accordance with another aspect of the present invention. Damping apparatus 200 may be used to damp the vibration of an instrument having a payload and a base. Damping apparatus 200 includes magnets 204, rod 206, vanes 208, lever arm 212, and pivot point 214. Damping apparatus 200 is similar to damping apparatus 100 with the exception of the differences enumerated herein.

The magnets 204 are coupled to rod 206 via lever arm 212. Accordingly, magnets 204, and not vanes 208, move in response to a displacement of rod 206. For example, as illustrated by dashed lines in FIG. 4, when rod 206 is displaced in the downward direction, lever arm 212 rotates such that magnet 204 is displaced upward. Damping apparatus 200 includes one or more magnets 204 extending radially outward from rod 206.

The vanes 208 are coupled in place to a housing (not shown). Magnets 204 extend into gaps between vanes 208. As magnets 204 move in response to the displacement of rod 206, an eddy current is created in each vane 208. The eddy current generates a magnetic field which interacts with the magnetic field of magnets 204 to provide a damping force opposite the motion of magnets 204. The damping force applied to each magnet 204 is transferred to rod 206, substantially as described above with respect to damping apparatus 100. As indicated in FIG. 4, the damping force on the rod caused by the levering action of lever arm 212 is amplified by a factor of $(b/a)^2$, where "b" is the length of the lever arm 212 between pivot point 214 and magnet 204, and "a" is the length of the lever arm 212 between pivot point 214 and rod 206.

Figure 5:
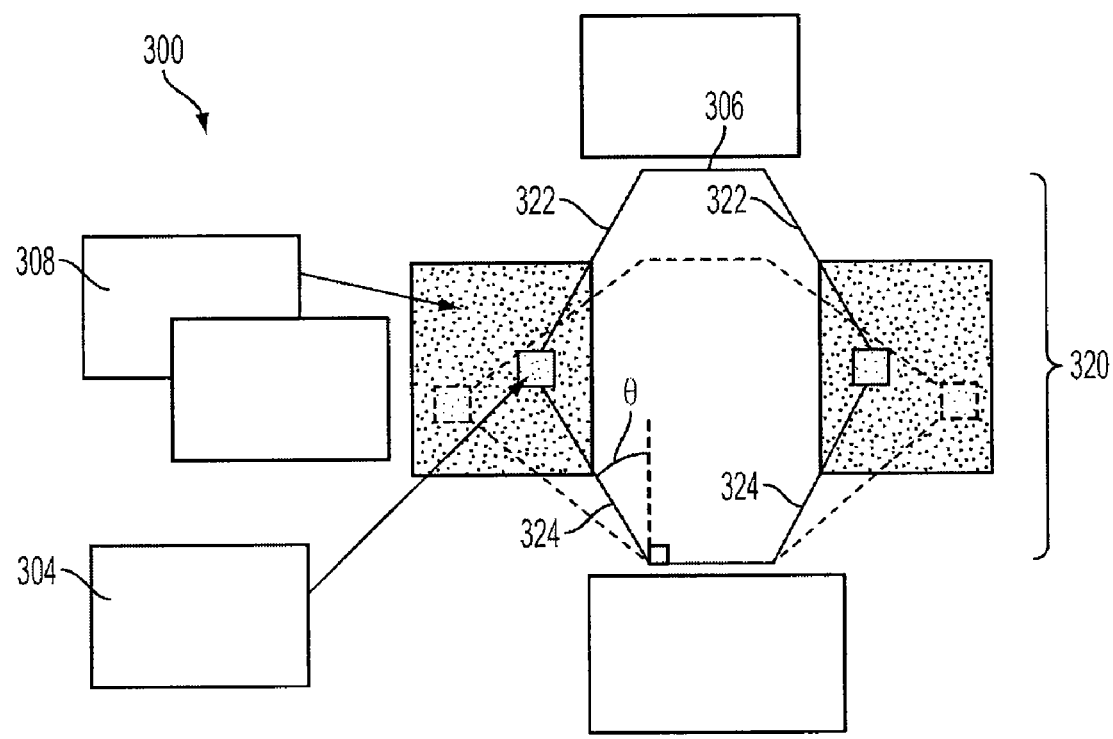
FIG. 5 is a diagram of an exemplary damping apparatus in accordance with yet another aspect of the present invention.

FIG. 5 is a diagram of an exemplary damping apparatus 300 illustrating a so-called "scissor jack" configuration in accordance with yet another aspect of the present invention. Damping apparatus 300 may also be used to damp the vibration of an instrument having a payload and a base. Damping apparatus 300 includes magnets 304, payload member 306, vanes 308, and scissor jack 320. Additional details of damping apparatus 300 are described below.

The vanes 308 are coupled to the base of an instrument. In an exemplary embodiment, vanes 308 are circumferentially arranged around payload member 306. Vanes 308 are spaced apart to define a number of circumferential gaps. Each gap is configured to receive one or more magnets 304 arranged either axially or radially. Vanes 308 may be formed from a conductive, non-magnetic material or combination of materials.

The payload member 306 is coupled to the payload of the instrument. In an exemplary embodiment, payload member 306 experiences the vibrational forces acting on an associated payload. Payload member 306 moves responsive to these vibrational forces in the axial direction.

The magnets 304 are coupled to payload member 306. In an exemplary embodiment, magnets 304 extend radially outward from payload member 306 into gaps between vanes 308. Magnets 304 are coupled to the payload member 306 such that a movement of the payload member results in a movement of the magnets 304. In a further exemplary embodiment, magnets 304 move within the gaps created by vanes 308. It is contemplated that apparatus 300 may include one or more magnets 304 extending from payload member 306 in different radial and/or axial directions. Exemplary magnets 104 may include rare earth magnets and/or electromagnets.

The scissor jack 320 connects payload member 306 with magnets 304. In an exemplary embodiment, for each magnets 304, scissor jack 320 includes upper and lower arms 322 and 324. Each upper arm 322 and each lower arm 324 may be fixed at one end to a magnet 304. Upper arms 322 may be fixed at the opposite end to payload member 306. Lower arms 324 may be fixed at the opposite end to the base. The attachment portion of arms 322 and 324 that attaches to magnets 304 may be flexible to allow a firm connection with magnets 304 through varying angles of arms 322 and 324.

The movement of magnets 304 with respect to payload member 306 is illustrated using dotted lines in FIG. 5. In an exemplary embodiment, the distance of movement of magnets 304 relative to payload member 306 may depend on the angle between the upper and lower arms 322 and 324 of scissor jack 320 and the direction of the movement of payload member 306. For example, payload member 306 is depicted as having moved a distance downward in the vertical direction in response to a vibration of the payload. As payload member 306 moves toward the base of scissor jack 320, arms 322 and 324 compress toward each other, thereby moving magnets 304 outward.

In an exemplary embodiment, the displacement D of magnets 304 is dependent on the angle θ that upper and lower arms 322 and 324 of scissor jack 320 form in the vertical direction. For small movements of payload member 306, this relationship may be expressed as follows:

$$D = \frac{\cos(\theta)}{\sin(\theta)} X = \frac{1}{\tan(\theta)} X$$

Accordingly, damping apparatus 300 may be configured such that a displacement D of magnets 304 in response to a displacement X of payload member 306 is dependent on an angle θ of the scissor jack 320. For example, the smaller the angle θ (i.e. less than 45 degrees), the lower the value of tan(θ), and the greater the displacement D of magnets 304 with respect to the displacement X of payload member 306. As described above with respect to apparatus 100, it will be understood that this ratio will remain the same with respect to the respective velocities of payload member 306 and magnet 304. Accordingly, as calculated above with respect to apparatus 300, the amplitude of the damping force on payload member will correspond to the square of this ratio, or $(1/\tan(\theta))^2$, as indicated in FIG. 5.

Figure 6:
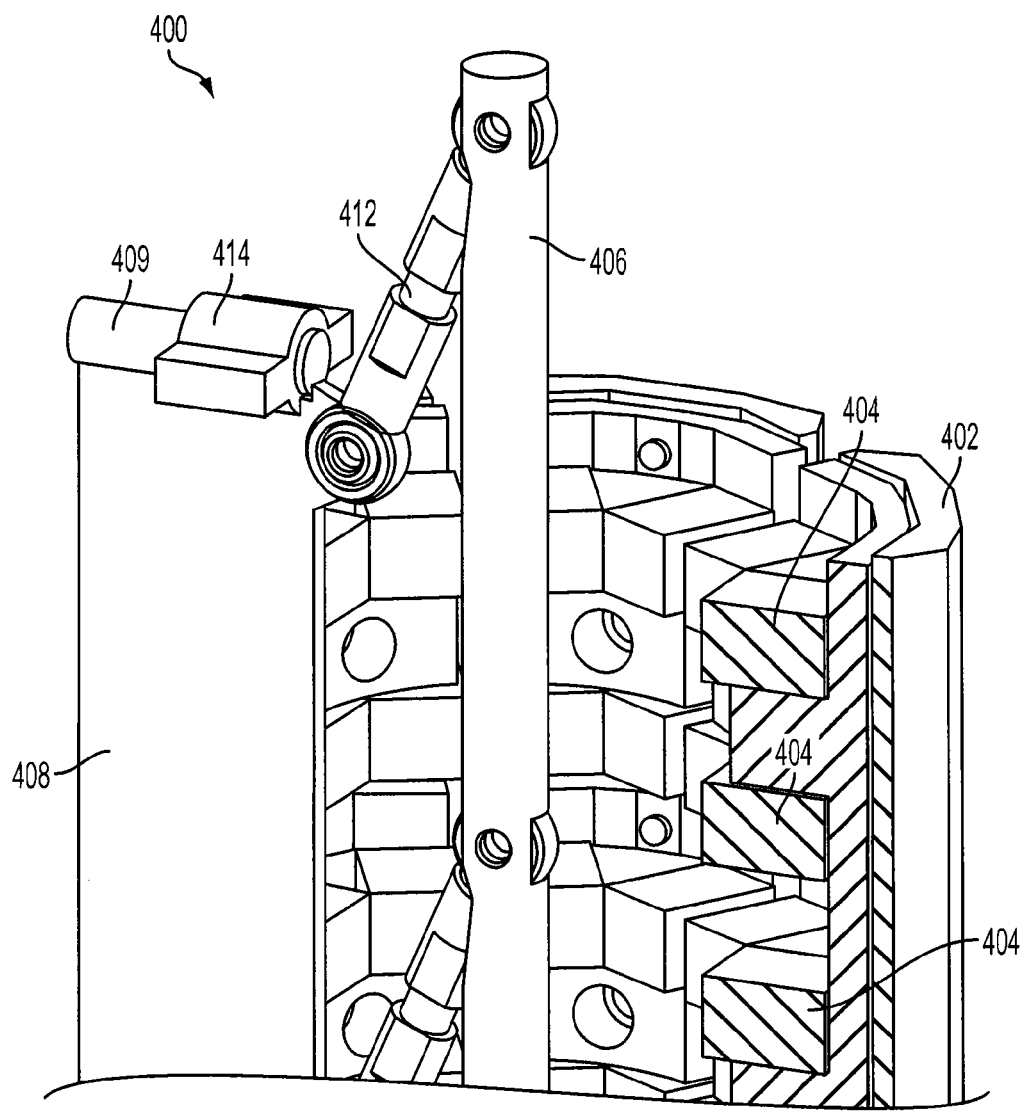
FIG. 6 is a cut-away perspective view of an exemplary damping apparatus according to still another aspect of the present invention.

FIG. 6 is a cut-away perspective view of another exemplary damping apparatus 400 which employs the scissor-jack configuration according to an aspect of the present invention. As described above, damping apparatus 400 may be used to damp the vibration of a payload relative to a base. Damping apparatus 400 includes housing 402, magnets 404, rod 406, vanes 408, scissor arms 412, and linear bearings 414. Additional details of damping apparatus 400 are described herein.

The housing 402 houses the damping apparatus. In an exemplary embodiment, housing 402 is attached to a base (not shown). Housing 402 may provide support for the elements of damping apparatus 400 that provide the payload with a damping force. An exemplary housing 402 may be formed from suitable non-magnetic materials or a combination of magnetic and non-magnetic materials. Although housing 402 is illustrated having a generally cylindrical outer shape, it is contemplated that housing 402 may be any shape to accommodate and support the elements of apparatus 400. Housing 402 may further include slots, as illustrated, to accommodate radial movement of vanes 408.

The magnets 404 are attached to the inside of housing 402. In an exemplary embodiment, magnets 404 are circumferentially arranged around the inner surface of housing 402. The magnets may extend axially throughout housing 402. Magnets 404 are spaced apart to define a number of circumferential gaps. Each gap is configured to receive a vane 408. Magnets 404 may be any suitable type of permanent magnets and may include rare earth magnets. Magnets 404 may further be include electromagnets. As illustrated with regard to apparatus 300, magnets 404 and vanes 408 are interchangeable in position with respect to apparatus 400, i.e. magnets 404 may move while vanes 408 are stationary.

The rod 406 extends axially through housing 402. In an exemplary embodiment, rod 106 is coupled to the payload (not shown). Rod 406, thereby, receives the vibrational forces acting on the payload. Accordingly, rod 406 is movable within the housing in the axial direction. An exemplary rod 406 may be formed from suitable non-magnetic materials or a combination of magnetic and non-magnetic materials. Although rod 406 is illustrated as an elongated axial cylinder, it is contemplated that any payload member affixed to the payload and movable in response to a vibration of the payload may be used.

The vanes 408 extend axially through housing 402. In an exemplary embodiment, vanes 408 are coupled to rod 406 through scissor arm 412. Vanes 408 may extend radially outward from rod 406 into gaps between magnets 404. Vanes 408 may be coupled to rod 406 such that a movement of rod 406 axially results in a movement of vanes 408. Vanes 408 may further be coupled to move in the radial direction relative to rod 406. In a further exemplary embodiment, vanes 408 may be coupled to move axially such that vanes 408 remain in the gaps between magnets 404. Vanes 408 may further include rounded edges or bars 409 for seating in linear bearings 414. Edges 409 may facilitate movement of vanes 408 in the radial direction. Although one vane 408 is illustrated in FIG. 6, it is contemplated that apparatus 400 may include multiple vanes 408 extending from rod 406 in different radial directions. Vanes 408 may be formed from any suitable conductive material. Exemplary vanes 408 may be formed of a conductive material, such as copper, aluminum, or beryllium. Exemplary vanes may also be formed of a combination of conductive and non-conductive materials. Although vanes 408 are illustrated as flat sheets, it is contemplated that any extension member extending from rod 406 between magnets 404 may be used.

Scissor arms 412 connect rod 406 with vanes 408. In an exemplary embodiment, scissor arms 412 are fixed at one end to rod 406 and at an opposite end to one or more vanes 408. There may be one or more scissor arms 412 attached to each vane 408. Scissor arm 412 may comprise a flexure arm or a rigid arm having flexure or rotary bearings. For example, the portion of scissor arm 412 that attaches to vanes 408 may rotate using a rotary bearing in order to allow a firm connection between scissor arm 412 and vane 408 through varying angles of lever arm 412. Lever arm 112 may alternately be formed integrally with vanes 408. As described above with respect to apparatus 300, the scissor arm may be configured such that movement of a payload member (i.e. rod 406) in an axial direction causes movement of a corresponding vane 408 in substantially a radial direction.

The number of vanes and magnets shown in FIG. 6, as well as their size, shape and position, are illustrative and not limiting. It is contemplated that different numbers of magnets and/or vanes may be used. Further, the size, shape and position of housing 402 and rod 406 are illustrative and not limiting.

The movement of vanes 408 with respect to rod 406 is described herein. In an exemplary embodiment, the distance of movement of vanes 408 relative to rod 406 may depend on the angle between scissor arms 412 and rod 406. For example, as payload member 406 moves toward the base of housing 402, scissor arms 412 are biased downward, thereby moving vanes 408 outward.

In an exemplary embodiment, similar to apparatus 300, the displacement of vanes 408 is dependent on the angle θ that scissor arm 412 forms with rod 406. For small movements of rod 406, this relationship may be expressed as follows:

$$D = \frac{\cos(\theta)}{\sin(\theta)} X = \frac{1}{\tan(\theta)} X$$

Accordingly, damping apparatus 400 may be configured such that a displacement D of vanes 408 in response to a small displacement X of rod 406 is dependent on an angle θ of the scissor arm 412 with rod 406. For example, the smaller the angle θ (i.e. less than 45 degrees), the lower the value of tan(θ), and the greater the displacement D of vanes 406 with respect to the displacement X of payload member 306. This may result in large displacements of vanes 408 when θ<15°. As described above with respect to apparatus 100, it will be understood that this ratio will remain the same with respect to the respective velocities of rod 406 and vanes 408. Accordingly, as calculated above with respect to apparatus 100, the amplitude of the damping force on payload member will correspond to the square of this ratio, or $(1/\tan(\theta))^2$, as described with respect to apparatus 300.

In the exemplary embodiments described above, a damping force is provided to either a conductive vane or permanent magnet when either one is moved with respect to the other. It will be understood by one of ordinary skill in the art that in the embodiments described above, either the conductive vanes (i.e. vanes 108) or permanent magnets (i.e. magnets 104) may extend from the payload member (i.e. rod 106). Thus, it is contemplated that the damping force will be provided by a damping member (i.e. either magnet 104 or vane 108) corresponding to an appropriate extension member (i.e. the other one of vane 108 or magnet 104) in order to dampen the movement of a payload member (i.e. rod 106).

The above principles of displacement amplification may be applicable to damping apparatus having other varying structures, such as a geared system, linkage mechanism, or fluid displacement amplification, for example. Thus, although the invention has been described primarily with respect to embodiments employing magnetic damping, the above principles of motion amplification are applicable to other damping devices as well, such as fluid dampers.

Figure 7:
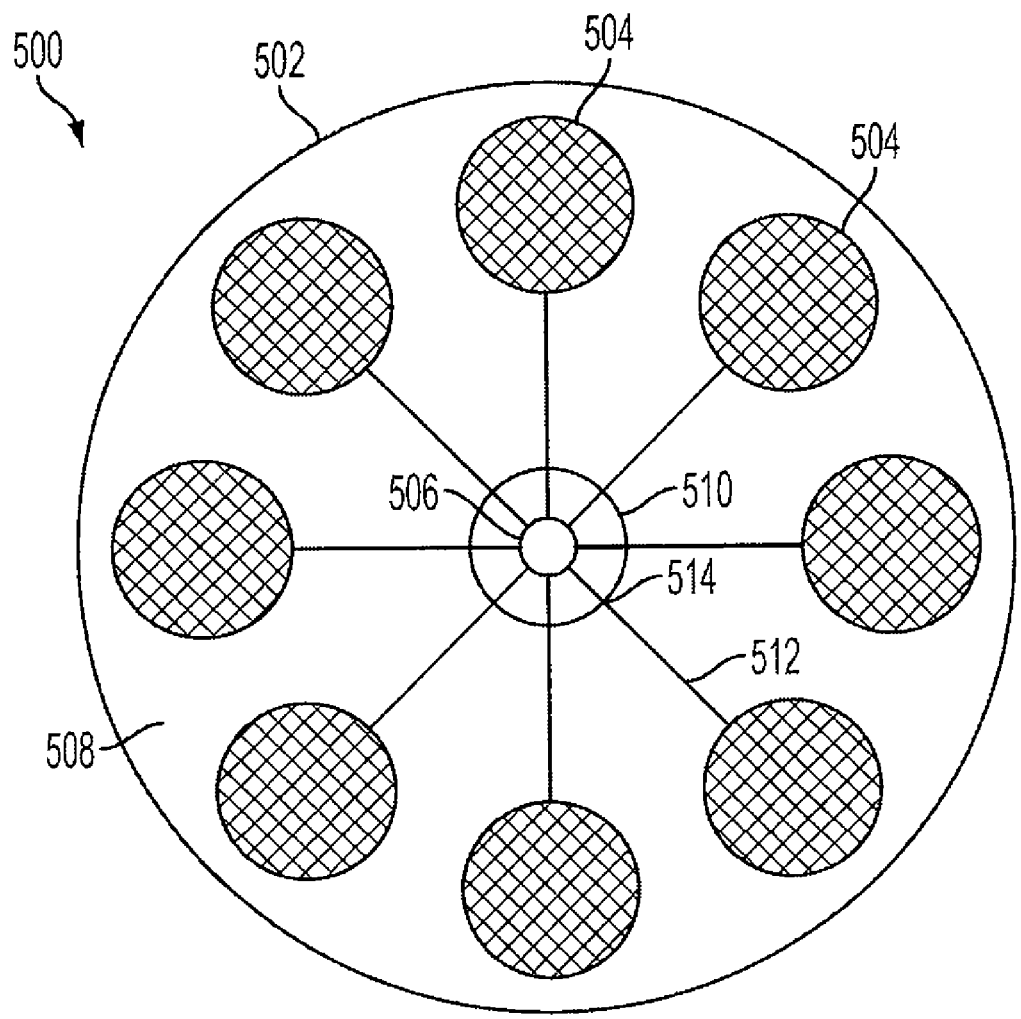
FIG. 7 is a diagram of an exemplary damping apparatus in accordance with another aspect of the present invention.

For example, FIG. 7 is an exemplary damping apparatus in accordance with another aspect of the present invention. Damping apparatus 500 may also be used to damp the vibration of an instrument having a payload and a base. Damping apparatus 500 includes housing 502, pistons 504, rod 506, fluid 508, inner cylinder 510, lever arms 512, and pivot points 514. Damping apparatus 500 similar to damping apparatus 100 with the exception of the differences pointed out below.

The pistons 504 are coupled to rod 506 via lever arm 512. Accordingly, pistons 504 move in response to a displacement of rod 506. For example, when rod 506 is displaced in the upward direction (i.e. out of the page), lever arm 512 rotates about pivot point 514 such that pistons 504 are displaced downward (i.e. into the page). Damping apparatus 500 may include one or more pistons 504 extending radially outward from rod 506. Pistons 504 may further include individual housings for containing fluid 508

The fluid 508 may be disposed within housing 502 and inner cylinder 510. More particularly, fluid 508 may be particularly disposed in proximity to or within the individual housings for each piston 504. In an exemplary embodiment, as pistons 504 move in response to a displacement of rod 506, pistons 504 move through fluid 508. The viscosity of fluid 508 provides a damping force opposite the motion of pistons 504. The damping force provided to pistons 504 is transferred to rod 506, substantially as described above with respect to damping apparatus 100. Similarly to the embodiment of FIG. 1, the damping force on the rod caused by the levering action of lever arm 512 is amplified by a factor of $(b/a)^2$, where "b" is the length of the lever arm 512 adjacent pistons 504 and "a" is the length of the lever arm 512 adjacent rod 506.

With respect to damping apparatus 500, any structure may be used in place of pistons 504 that will promote the generation of a damping force as the structure moves through fluid 508.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A damping apparatus comprising:
    a payload member;
    a housing surrounding the payload member;
    an extension member coupled to the payload member, such that a movement of a first distance by the payload member results in a movement of a second distance by the extension member, the second distance greater than the first distance, the extension member having an elongated portion extending outwardly from the payload member through the housing, the elongated portion having an end fixed to the payload member;
    a damping member for applying a first damping force to the extension member in response to the movement of the extension member;
    a plurality of magnets arranged circumferentially around the housing; and
    at least one conductive vane coupled to the extension member, wherein the at least one conductive vane extends radially between a pair of the plurality of magnets;
    wherein application of the first damping force to the extension member provides a second damping force on the payload member, the second damping force greater than the first damping force.

2. The damping apparatus of claim 1, wherein the payload member is a rod, the rod configured to be connected to a payload.

3. The damping apparatus of claim 1, wherein the first damping force on the extension member is a magnetic force generated in response to the movement of the extension member.

4. The damping apparatus of claim 1, wherein the elongated portion of the extension member is a lever arm, the lever arm configured to pivot about a pivot point mounted on the housing.

5. The damping apparatus of claim 4, wherein the lever arm is a flexure arm.

6. The damping apparatus of claim 4, wherein:
    the lever arm has a first portion extending between the pivot point and the payload member;
    the lever arm has a second portion extending between the pivot point and the extension member;
    the second portion is longer than the first portion.

7. A damping apparatus comprising:
    a rod;
    a housing surrounding the rod;
    at least one flexible lever arm extending outwardly from the rod through the housing, the at least one flexible lever arm having an end fixed to the rod and being configured to pivot about at least one pivot point mounted on the housing;
    at least one vane, each one of the at least one vane coupled to a respective one of the at least one lever arm, such that a movement of a first distance by the rod causes the lever arm to move the at least one vane a second distance, where the second distance is greater than the first distance; and
    a plurality of magnets arranged circumferentially around the housing, wherein the at least one vane extends radially between a pair of the plurality of magnets such that the pair of the plurality of magnets are configured to apply a first damping force to the at least one vane responsive to the movement of the at least one vane,
    wherein application of the first damping force to the at least one vane causes the lever arm to provide a second damping force on the rod which is greater than the first damping force.

* * * * *